United States Patent
Quist et al.

(10) Patent No.: US 7,948,215 B2
(45) Date of Patent: May 24, 2011

(54) METHODS AND APPARATUSES FOR POWER GENERATION IN ENCLOSURES

(75) Inventors: Gregory M. Quist, Escondido, CA (US); David A. Drake, Escondido, CA (US)

(73) Assignee: Hadronex, Inc., Escondido, CA (US)

( * ) Notice: Subject to any disclaimer, the term of this patent is extended or adjusted under 35 U.S.C. 154(b) by 498 days.

(21) Appl. No.: 12/081,532

(22) Filed: Apr. 17, 2008

(65) Prior Publication Data

US 2008/0258694 A1    Oct. 23, 2008

Related U.S. Application Data

(60) Provisional application No. 60/925,204, filed on Apr. 19, 2007.

(51) Int. Cl.
- *H01J 45/00* (2006.01)
- *H02K 44/08* (2006.01)
- *H02N 11/00* (2006.01)
- *H02P 3/00* (2006.01)
- *H02P 9/06* (2006.01)
- *H02P 15/00* (2006.01)
- *H02P 9/00* (2006.01)
- *F02B 63/04* (2006.01)
- *H02K 7/18* (2006.01)

(52) U.S. Cl. ............. 322/2 R; 322/10; 322/44; 290/1 A; 290/40 A

(58) Field of Classification Search .................. 290/1 A, 290/40 A; 322/2 R, 10, 44
See application file for complete search history.

(56) References Cited

U.S. PATENT DOCUMENTS

| | | | | |
|---|---|---|---|---|
| 2,510,397 A * | 6/1950 | Hansell | | 374/174 |
| 2,881,384 A * | 4/1959 | Durant | | 322/2 R |
| 2,915,652 A * | 12/1959 | Joseph et al. | | 310/306 |
| 3,175,105 A * | 3/1965 | Creedon et al. | | 310/306 |
| 3,666,976 A * | 5/1972 | Gourlay et al. | | 310/324 |
| 3,983,423 A * | 9/1976 | Rasor et al. | | 310/306 |
| 4,146,800 A * | 3/1979 | Gregory et al. | | 290/44 |
| 4,206,396 A * | 6/1980 | Marks | | 322/2 A |
| 4,314,192 A * | 2/1982 | Caro | | 322/2 R |
| 4,368,416 A * | 1/1983 | James | | 322/2 R |
| 4,433,248 A * | 2/1984 | Marks | | 290/44 |
| 4,467,236 A * | 8/1984 | Kolm et al. | | 310/321 |
| 4,651,716 A * | 3/1987 | Forester et al. | | 601/2 |
| 4,760,253 A * | 7/1988 | Hutton | | 250/288 |
| 5,051,584 A * | 9/1991 | Gray et al. | | 250/288 |
| 5,095,465 A * | 3/1992 | Stokoe, II | | 367/14 |
| 5,329,101 A * | 7/1994 | Ellis | | 219/632 |
| 5,747,967 A * | 5/1998 | Muljadi et al. | | 320/148 |
| 5,835,996 A * | 11/1998 | Hashimoto et al. | | 323/364 |
| 5,901,556 A * | 5/1999 | Hofler | | 62/6 |
| 5,942,806 A * | 8/1999 | Veliadis | | 290/1 R |
| 5,996,345 A * | 12/1999 | Hofler | | 60/517 |
| 6,134,124 A * | 10/2000 | Jungreis et al. | | 363/34 |
| 6,157,168 A * | 12/2000 | Malik | | 320/128 |

(Continued)

*Primary Examiner* — Pedro J Cuevas
(74) *Attorney, Agent, or Firm* — The Nath Law Group; Laurie A. Axford

(57) ABSTRACT

An apparatus for generating power in an enclosure includes a power generation device configured to operate in the environmental conditions of the enclosure, a first power storage device connected to the power generation device and configured to store power generated by the power generation device, a power converter connected to the power storage device and configured to output power at a voltage different than that output by the power storage device, and a second power storage device connected directly or indirectly to the power converter and configured to store power output by the power converter. The second power storage device may then provide power for at least one component of an environmental monitoring system.

18 Claims, 9 Drawing Sheets

U.S. PATENT DOCUMENTS

| | | | |
|---|---|---|---|
| 6,185,940 B1* | 2/2001 | Prueitt | 60/649 |
| 6,369,461 B1* | 4/2002 | Jungreis et al. | 307/46 |
| 6,407,484 B1* | 6/2002 | Oliver et al. | 310/339 |
| 6,424,079 B1* | 7/2002 | Carroll | 310/339 |
| 6,483,781 B2* | 11/2002 | Igarashi et al. | 368/66 |
| 6,542,440 B1* | 4/2003 | Kihara | 368/204 |
| 6,580,177 B1* | 6/2003 | Hagood et al. | 290/1 R |
| 6,848,407 B2* | 2/2005 | Kobayashi et al. | 123/182.1 |
| 6,856,037 B2* | 2/2005 | Yazawa et al. | 290/43 |
| 6,914,343 B2* | 7/2005 | Hiller et al. | 290/43 |
| 6,919,648 B2* | 7/2005 | Bolz et al. | 290/40 C |
| 6,938,311 B2* | 9/2005 | Tanielian | 29/25.35 |
| 6,943,531 B2* | 9/2005 | Fukaya | 322/10 |
| 6,995,496 B1* | 2/2006 | Hagood et al. | 310/317 |
| 7,064,454 B2* | 6/2006 | Fukaya et al. | 290/1 A |
| 7,102,244 B2* | 9/2006 | Hunter, Jr. | 290/1 R |
| 7,109,597 B1* | 9/2006 | Bose | 290/43 |
| 7,239,031 B2* | 7/2007 | Ricketts | 290/1 R |
| 7,292,143 B2* | 11/2007 | Drake et al. | 340/539.26 |
| 7,304,416 B2* | 12/2007 | Mullen | 310/339 |
| 7,329,959 B2* | 2/2008 | Kim et al. | 290/2 |
| 7,439,657 B2* | 10/2008 | Clingman et al. | 310/339 |
| 7,446,450 B2* | 11/2008 | Boland et al. | 310/309 |
| 7,471,033 B2* | 12/2008 | Thiesen et al. | 310/339 |
| 7,476,987 B2* | 1/2009 | Chang | 290/55 |
| 7,489,045 B1* | 2/2009 | Bradford et al. | 290/1 R |
| 7,570,028 B2* | 8/2009 | van Zyl | 322/36 |
| 7,592,712 B2* | 9/2009 | Perlo et al. | 290/55 |
| 7,598,858 B2* | 10/2009 | Quist et al. | 340/539.26 |
| 7,755,008 B2* | 7/2010 | Tsai | 219/628 |
| 7,808,236 B1* | 10/2010 | Huang et al. | 324/249 |
| 7,812,508 B2* | 10/2010 | Abramovich et al. | 310/339 |
| 7,830,071 B2* | 11/2010 | Abramovich et al. | 310/339 |
| 7,868,475 B1* | 1/2011 | Bradford et al. | 290/1 R |
| 7,870,732 B2* | 1/2011 | Kuo | 60/641.6 |
| 2001/0043512 A1* | 11/2001 | Igarashi et al. | 368/204 |
| 2002/0051368 A1* | 5/2002 | Ulinski et al. | 363/1 |
| 2002/0089309 A1* | 7/2002 | Kenney | 322/1 |
| 2003/0034652 A1* | 2/2003 | Slatkin | 290/1 R |
| 2003/0209909 A1* | 11/2003 | Fukaya et al. | 290/40 A |
| 2004/0008009 A1* | 1/2004 | Fukaya | 322/44 |
| 2005/0167987 A1* | 8/2005 | Perlo et al. | 290/1 R |
| 2005/0258717 A1* | 11/2005 | Mullen | 310/339 |
| 2007/0159326 A1* | 7/2007 | Quist et al. | 340/539.26 |
| 2008/0083139 A1* | 4/2008 | Mullen | 36/136 |
| 2008/0270048 A1* | 10/2008 | van Zyl | 702/57 |
| 2009/0001731 A1* | 1/2009 | Perlo et al. | 290/55 |
| 2009/0025773 A1* | 1/2009 | Stark | 136/212 |
| 2009/0107743 A1* | 4/2009 | Alston et al. | 180/65.21 |
| 2009/0195122 A1* | 8/2009 | Abramovich et al. | 310/319 |
| 2009/0195124 A1* | 8/2009 | Abramovich et al. | 310/339 |
| 2009/0195226 A1* | 8/2009 | Abramovich et al. | 322/2 R |
| 2009/0237170 A1* | 9/2009 | Van Zyl et al. | 331/127 |
| 2009/0278598 A1* | 11/2009 | van Zyl | 330/110 |
| 2010/0123428 A1* | 5/2010 | Wu et al. | 320/102 |
| 2010/0219646 A1* | 9/2010 | Hay | 290/1 A |
| 2010/0219688 A1* | 9/2010 | Shyu et al. | 307/66 |
| 2010/0244629 A1* | 9/2010 | Nagashima et al. | 310/339 |
| 2010/0275597 A1* | 11/2010 | Kuo | 60/641.7 |
| 2010/0313581 A1* | 12/2010 | Thompson et al. | 62/93 |
| 2010/0314968 A1* | 12/2010 | Mohamadi | 310/319 |
| 2010/0319747 A1* | 12/2010 | Wong et al. | 136/201 |
| 2011/0000206 A1* | 1/2011 | Aprad | 60/517 |

* cited by examiner

METHODS AND APPARATUSES FOR POWER GENERATION IN ENCLOSURES

CROSS-REFERENCE TO RELATED APPLICATIONS

This application claims the benefit of U.S. Provisional Patent Application No. 60/925,204, filed Apr. 19, 2007, the contents of which are hereby incorporated by reference in their entirety.

BACKGROUND OF THE INVENTION

1. Field of the Invention

The present application relates to methods and apparatuses for power generation, and, in particular, to methods and apparatuses utilizing a power generation device configured to operate in the environmental conditions of an enclosure.

2. Related Art

Sanitation and waste water systems are becoming increasingly expensive to operate and face daunting environmental, community and regulatory pressures. Agencies and organizations that manage sanitation systems face complex and costly problems. Three of the main problems facing sanitation system operators are sewage spills, treatment failure, and illegal dumping. The first two of these problems often result in uncontrolled spills of septic materials into the environment, causing environmental damage, health risks, and high cleanup and mitigation costs, while the third problem respectively generates a potential danger to treatment systems, the environment and uncontrolled liability for the sanitation operators.

Some methods have been proposed for monitoring of environmental parameters in manholes, to provide an early warning system to avoid many of the problems and costs that sanitation system operators face. Three such systems are disclosed in a prior patent and two prior patent applications filed by the applicants, including U.S. patent application Ser. No. 11/641,110, filed Dec. 19, 2006 and presently pending; U.S. patent application Ser. No. 11/134,691, filed May 20, 2005 and presently pending; and, U.S. Pat. No. 7,292,143, issued Nov. 6, 2007. The contents of these patent applications and this patent are incorporated herein by reference in their entirety. These systems can include a platform for a variety of sensors, for a variety of applications, including intrusion alarms, closed space monitoring for example for gases, water quality monitoring, traffic monitoring, and environmental or pollution monitoring, and by virtue of distribution in a wide coverage urban area, such a system can have multiple uses in addition to manhole monitoring, and can monitor many other enclosures.

Nearly all of the sensors, controllers, and communication devices of such systems require power for operation. Many power systems have been proposed for powering such equipment, but each such power system has its disadvantages. The use of standard 120V or 240V power requires trenching around and into a manhole, and poses a risk of electrocution. Alternatively, primary non-rechargeable batteries, or even rechargeable batteries unless recharged by some mechanism at or in the enclosure, have the unfortunate characteristic that they require periodic servicing for replacement/recharging. In many applications, such as environmental monitoring at a manhole, periodic servicing may be difficult, time consuming, or expensive.

What is desired is a power generation apparatus configured to operate in the environmental conditions of an enclosure such as a manhole, and to utilize these conditions in the generation of power for environmental monitoring devices.

SUMMARY OF THE INVENTION

The present subject matter addresses the above concerns by teaching the following methods and apparatuses.

The present disclosure includes an apparatus for generating power in an enclosure. The apparatus includes a power generation device configured to operate in the environmental conditions of the enclosure, and a first power storage device connected to the power generation device and configured to store power generated by the power generation device. This first power storage device may be a capacitor, or may be a rechargeable battery, or may be any other kind of power storage device. The apparatus also includes a power converter connected to the power storage device and configured to output power at a voltage different than that output by the power storage device; and a second power storage device connected directly or indirectly to the power converter and configured to store power output by the power converter. The second power storage device may then provide power for at least one component of an environmental monitoring system. The apparatus may optionally include a controller connected to the power converter and to the second power storage device, which controls the transfer of power from the power converter to the second power storage.

Many different power generation devices can be used in accordance with the present disclosure, each configured to operate in the environmental conditions of the enclosure. As non-limiting examples:

the power generation device can derive an electrical current from a temperature difference between two areas of the enclosure; when the enclosure is a manhole, these areas of the enclosure can be an inner surface of a manhole cover; an outer surface of the manhole cover; a manhole wall; a manhole ladder; a middle of the manhole; a bottom of the manhole; or, fluid in the manhole;

the enclosure can be a manhole, and the power generation device can derive an electrical current from a temperature change caused by condensation at a manhole cover;

the enclosure can be a manhole, and the power generation device can include a membrane which derives an electrical current from the transmission of moisture through the membrane;

the power generation device can derive an electrical current from ambient radio frequency energy collected from inside or outside the enclosure;

the power generation device can include an electromechanical generator or microelectromechanical system which derives an electrical current from acoustic or seismic motion; when the enclosure is a manhole, the acoustic or seismic motion can include motion of a manhole cover;

the power generation device can include an electromechanical generator which derives an electrical current from motion induced by airflow in the enclosure; when the enclosure is a manhole, and the airflow can include convection currents due to temperature gradients in the manhole;

the power generation device can include a device which generates electricity based upon changes in barometric pressure;

the power generation device can include a device which generates electricity based upon impact;

the power generation device can include a device which generates electricity based upon diurnal changes in temperature;

the power generation device can include gases which expand and contract in accordance with diurnal changes in the temperature of an enclosure cover or other structure to drive piezoelectric or electromagnetic generators; and the enclosure can be a manhole, and the power generation device can include a piezoelectric ring under a cover of the manhole but above the manhole run that transforms traffic impacts to electric power.

The present disclosure also includes a method of generating power in an enclosure. The method includes the steps of deriving an electrical current from at least one environmental aspect of the enclosure; storing an electrical charge generated by the electrical current; converting the stored charge to a charge of a different voltage; storing the different voltage charge; and transferring the stored different voltage charge to at least one component of an environmental monitoring system.

Many different environmental aspects can be used in accordance with the present disclosure. As non-limiting examples:

the environmental aspect can include a temperature difference between two areas of the enclosure;

the environmental aspect can include a temperature change caused by a formation of condensation at a surface of the enclosure;

the environmental aspect can include moisture, and the electrical current can be derived from passage of the moisture through a membrane;

the environmental aspect can include acoustic or seismic motion, and the electrical current can be derived by an electromechanical generator or microelectromechanical system;

the environmental aspect can include airflow in the enclosure, and the electrical current can be derived from motion induced by the airflow;

the environmental aspect can include changes in barometric pressure of the ambient air, and the electrical current can be derived from these pressure changes;

the environmental aspect can include diurnal changes in the temperature of an enclosure cover or other structure, and the electrical current can be derived through piezoelectric or electromagnetic generators driven by expansion and contraction of gases; and the environmental aspect can include traffic impacts, and the electrical current can be derived from a piezoelectric ring under a cover of the manhole but above the manhole run.

The present disclosure also includes a system for generating power in an enclosure. The system can include: means for deriving an electrical current from at least one environmental aspect of the enclosure; means for storing an electrical charge generated by the electrical current; means for converting the stored charge to a charge of a different voltage; means for storing the different voltage charge; and means for transferring the stored different voltage charge to at least one component of an environmental monitoring system.

BRIEF DESCRIPTION OF THE DRAWINGS

The features, nature, and advantages of the presently disclosed methods and apparatuses will become more apparent from the detailed description set forth below when taken in conjunction with the drawings in which like reference characters identify corresponding items throughout.

DETAILED DESCRIPTION

Figure 1:
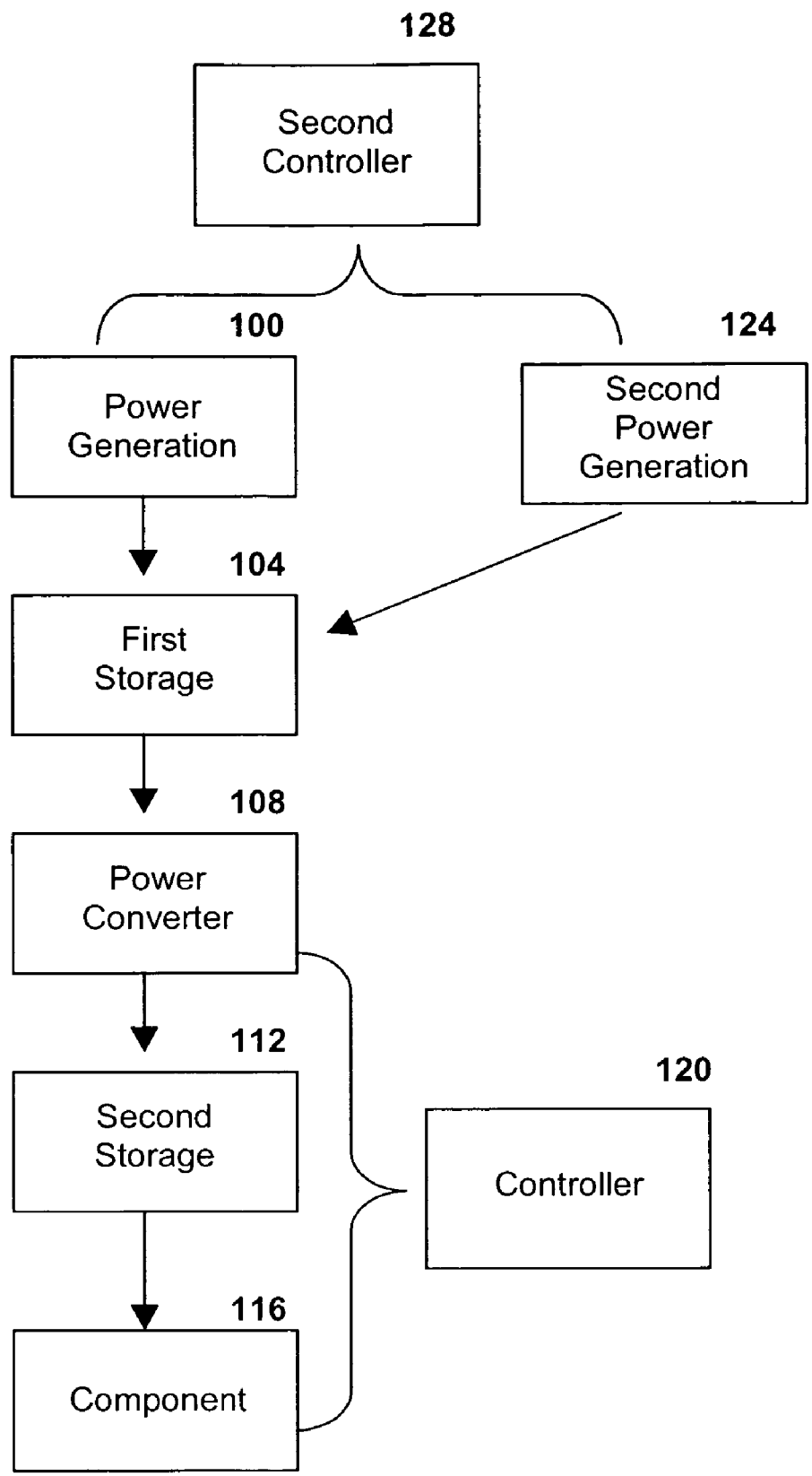
FIG. 1 is a schematic illustration of an apparatus for generating power in an enclosure according to the present disclosure.

In the following detailed description, reference is made to the accompanying drawings, which form a part hereof, and in which are shown by way of illustration specific embodiments in which the subject matter may be practiced. In this regard, terminology such as "first," "then," "afterwards," "before," "next," "finally," "above," "below," "top," "bottom," "front," "back," "leading," "trailing," etc., is used with reference to the drawing being described. Because the processes and methods of the present subject matter can be performed in a number of different orders, and because the individual elements of the apparatus and systems of the present subject matter may be configured in a number of different orders, the above terminology is used for purposes of illustration and is in no way limiting. It is to be understood that other embodiments may be utilized and logical changes may be made without departing from the scope of the present subject matter. The following detailed description, therefore, is not to be taken in a limiting sense, and the scope of the present subject matter includes the full scope of the appended claims.

Although a number of discrete embodiments are described below, it is to be understood that these are merely non-limiting examples, and that any given embodiment of the subject matter may comprise some of the features of one shown embodiment, and/or some of the features of another shown embodiment. In the charts presented herewith, optional steps are illustrated in dashed lines. Other modifications between embodiments will be clear to one skilled in the art upon reading the following disclosure.

In general, enclosures such as manholes may have unique environmental conditions and aspects which can be utilized to derive power for at least one component of an environmental monitoring system. Since manholes and other enclosures can extend deep into the cool earth, and can be exposed to solar energy at their top but not at their bottom, temperature differences between two areas of the enclosure can be utilized to derive power. Since manholes and other enclosures may provide a moderating temperature environment that could be either cooler or warmer that an enclosure cover over the course of the day, these temperature differences and their changes produce heat flows toward or away from the cover, which may be utilized to derive power. Since manholes and other enclosures may contain more moisture than their surrounding environments, temperature changes caused by a formation of condensation at a surface of the enclosure can be utilized to derive power, and/or electrical current can be derived from passage of the moisture through a membrane. Since manholes and other enclosures can be subject to seismic motion (such as from motor or rail vehicles passing overhead or nearby) an electrical current can be derived by an electromechanical generator or microelectromechanical system. Finally, since manholes and other enclosures often have convection currents and other pressure-differential-based airflows, electrical current can be derived from motion induced by the airflow or by the pressure differences.

Energy and currents derived from the above environmental conditions and aspects are often small, but can be sufficient to trickle-charge rechargeable batteries or other power sources. These methods could greatly increase the lifetime of the batteries and greatly reduce the frequency of service needed to replace batteries, especially when used in conjunction with a power converter and/or a controller, as described below.

FIG. 1 is a schematic illustration of an apparatus for generating power in an enclosure according to the present disclosure. The apparatus includes a power generation device 100 configured to operate in environmental conditions of the enclosure, such as those listed above. Power generation devices will be described in detail in reference to FIGS. 3-8.

The apparatus also includes a first power storage device 104 connected to the power generation device and configured to store power generated by the power generation device. This first power storage device may be a capacitor, or may be a rechargeable battery, or may be any other kind of power storage device.

The apparatus also includes a power converter 108 connected to the power storage device and configured to output power at a voltage different than that output by the power storage device. Since energy and currents derived from the above environmental conditions and aspects are often small, they may generate voltages only in the range of 0.1 to 1.0 volts, although this range is merely a non-limiting example, and other voltages may be generated, including voltages in the range of 0.5 to 5.0 volts, 0.1 to 5.0 volts, and 0.5 to 1.0 volts. Even if combined in series, such energies and currents might not exceed 2 to 10 volts. For this reason, a power converter 108 may be used to help produce an ultimate output of 2 to 24 volts. Again, this is a non-limiting example, and other values of output powers for the power converter 108 may be used, including ultimate outputs of 12 to 24 volts, or 1 to 2 volts. As a further non-limiting example, the power converter 108 may include a switched inductor boost circuit and/or a boost regulator to aid in converting the power for use. Although the above examples refer to the conversion of low voltage energy to higher voltage energy, it should be noted that some methods disclosed herein (such as piezoelectric generators) may produce an originally high voltage energy, in which case the power converter 108 may be used to produce a ultimate output of a lower voltage.

The apparatus also includes a second power storage device 112 connected directly or indirectly to the power converter and configured to store power output by the power converter. The second power storage device 112 may be a rechargeable battery such as a nickel metal hydride cell or lithium ion cell, although other power storage devices may be used. The second power storage device may then provide power for at least one component 116 of an environmental monitoring system.

The apparatus may optionally include a controller 120 connected to the power converter and to the second power storage device, which controls the transfer of power from the power converter to the second power storage. Such a controller 120 can help maximize the life and efficiency of the second power storage device 112 by regulating the rate at which it is charged or recharged, optionally by monitoring its power output and adjusting its charge rate appropriately.

The apparatus may optionally include a second power generation device 124, also configured to operate in environmental conditions of the enclosure. The apparatus may optionally also include a second controller 128 connected to both power generation devices, which selects one of the power generation devices for use at a given time with respect to the environmental conditions of the enclosure. More than two power generation devices, or different or similar types, may be used.

Figure 2:
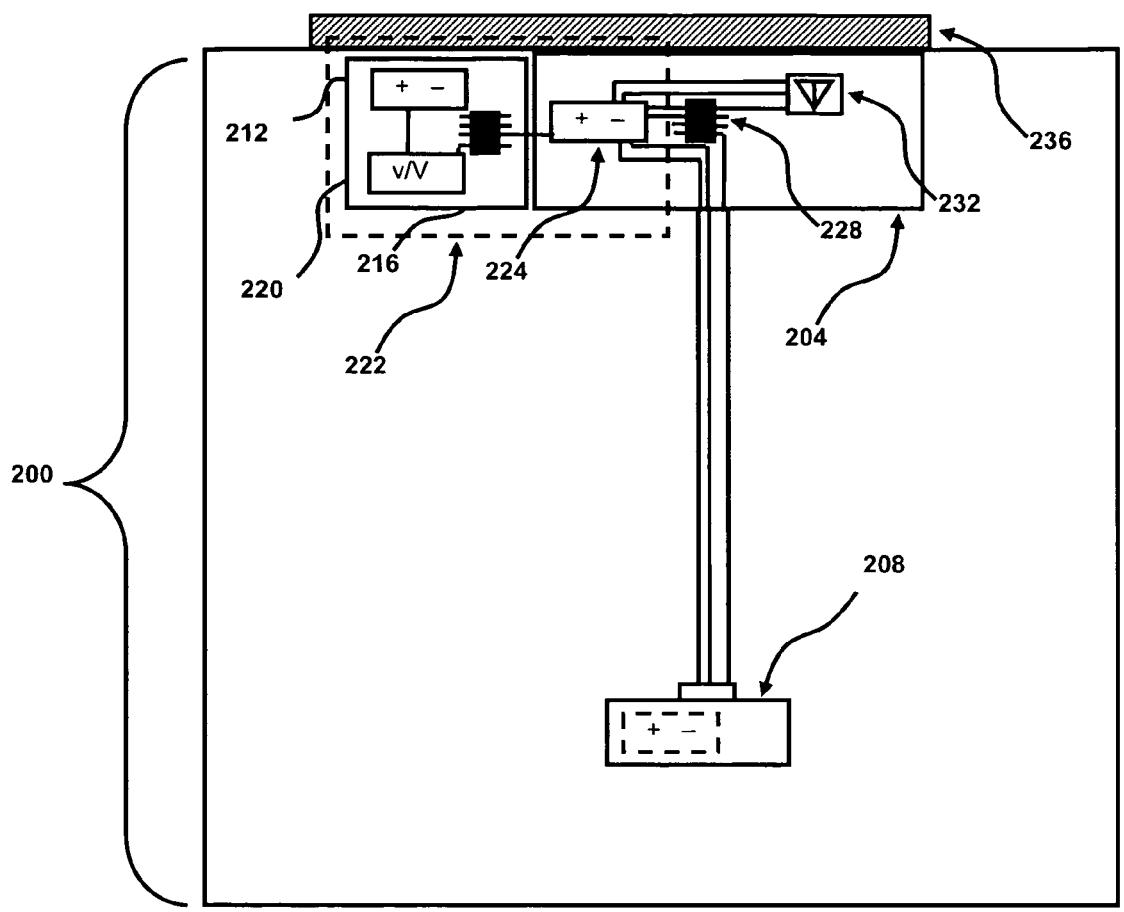
FIG. 2 illustrates an operational environment for an apparatus for generating power in an enclosure according to the present disclosure.

FIG. 2 illustrates an operational environment for an apparatus 222 for generating power in an enclosure according to the present disclosure. Here, a manhole 200 is illustrated as an enclosure, but it should be clear from the present disclosure that other enclosures may be used. The manhole 200 includes a manhole cover 236, to which an environmental monitoring system 204 is attached. The environmental monitoring system utilizes a sensor 208 suspended from a cable. Readings from the sensor 208 are fed to a processor 228, which broadcasts measurements, alerts, or other communications by way of an antenna 232. Many other environmental monitoring systems may be used, as illustrated in U.S. patent application Ser. Nos. 11/641,110, 11/134,691, and U.S. Pat. No. 7,292,143, issued Nov. 6, 2007.

Environmental monitoring system 204 derives its power from an apparatus for generating power in an enclosure in accordance with the present disclosure. This power apparatus 222 includes a first power storage device 212, a power converter 220; and a second power storage device 224. As illustrated here, the second power storage device 224 may be housed in the environmental monitoring system 204, but may alternatively be housed separately with the power apparatus 222. Still alternatively, the environmental monitoring system 204 and power apparatus 222 may be housed together. Optional controller 216 is illustrated as connected to the power converter 220 and to the second power storage device 224, to control the transfer of power from the power converter 220 to the second power storage 224.

Importantly, note that any suspended sensor 208 may require power, and that although this power may be delivered from the housing of the monitoring system 204 above, the sensor may be configured to derive its own power from the same or an additional power apparatus 222; Thus, the present disclosure includes scenarios where individual sensors are provided with their own power generation device, first power storage device, power converter, and second power storage device. This is particularly advantageous where the sensor is located somewhere where power is easily derived: as non-limiting examples, motion or tamper sensors at a manhole cover can include a condensation-based power source, since condensation often occurs at the cover; suspended airflow sensors can include airflow-based power sources; and, radio receiving sensors can include devices for converting radio energy to power.

Various power generation devices configured to operate in environmental conditions of the enclosure will now be described with reference to FIGS. 3-8.

Figure 3:
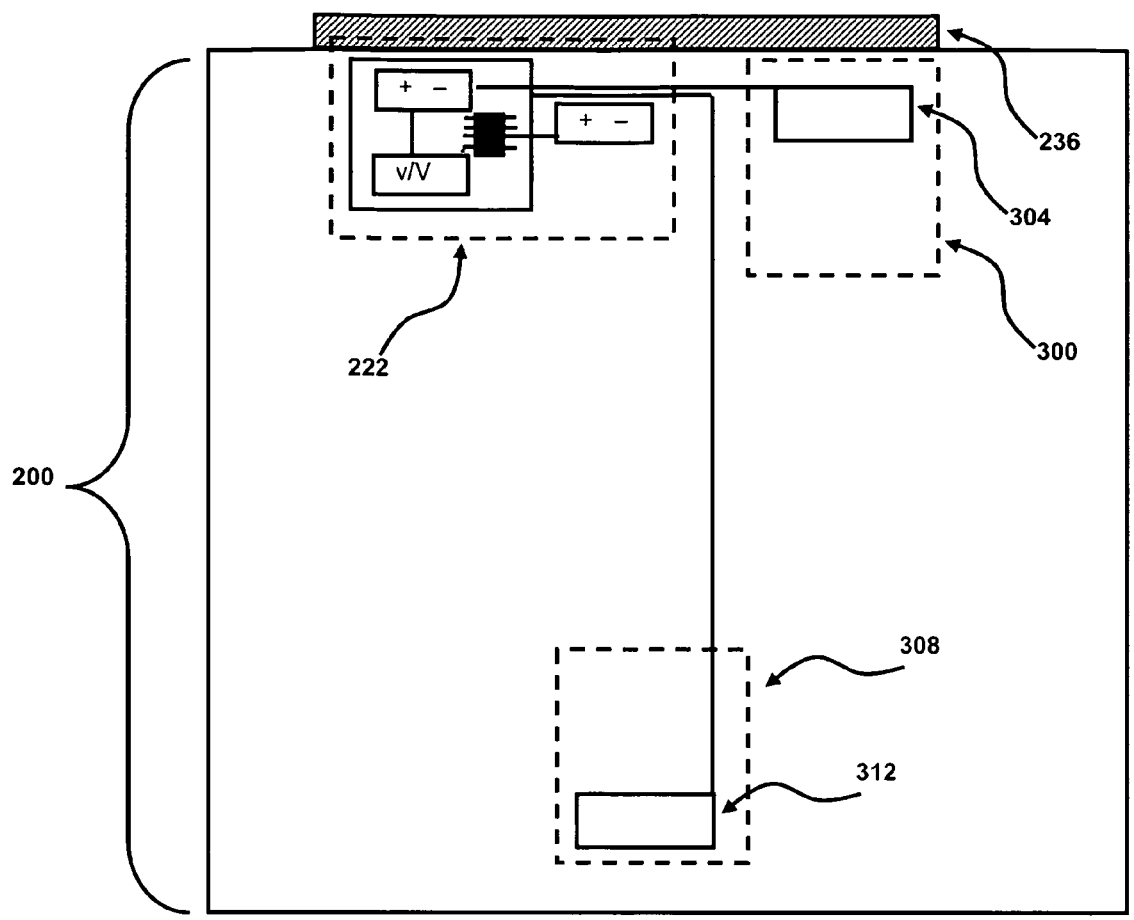
FIG. 3 illustrates an apparatus for generating power in an enclosure utilizing a temperature difference between two areas of the enclosure according to the present disclosure.

FIG. 3 illustrates an apparatus 222 for generating power in an enclosure 200 utilizing a temperature difference between two areas 300, 308 of the enclosure 200. Large enclosures, especially those fully or partially underground, can present a significant difference in temperature between two areas of the enclosure. In the case of sewer manholes, there can be a significant difference in temperature between a solar-loaded manhole cover 236, for example, and the environment immediately below the manhole cover. Alternatively, there can be a significant difference in temperature between the top of the manhole and the bottom of the manhole, or between the air in the manhole and the fluid travelling in the manhole. Other areas can include any inner surface of the manhole cover or manhole, any outer surface of the manhole cover or manhole, any manhole wall, a manhole ladder, any region in the middle of the manhole, any region at the bottom of the manhole, or, any fluid in the manhole. Note that in cold environments the manhole cover may be significantly lower in temperature than the moderating environment of the underground manhole volume. Thus the temperature difference that can be exploited uses flow of heat from the manhole volume to the colder cover.

A number of devices can be used to generate power where a temperature difference is found. Some such devices utilize the "Seebeck" effect, in which power is generated from the direct conversion of a temperature difference to current. Early mechanisms for generating power from a temperature difference may be found, for example, in U.S. Pat. Nos. 2,510,397; 2,881,384; 2,915,652; or 3,175,105, incorporated herein by reference, but many modern materials are also available for use. Such modern materials can include pairs of "n" and "p" doped semiconductors. Metals such as copper, zinc, iron, manganese, nickel, tin and silver, in various pairs, can also be used. As a non-limiting example, FIG. 3 shows two metal plates 304, 312 of differing material, suspended at different locations in the manhole 300, 308 where temperature is expected to vary, and in electric communication with the first power source of the power apparatus 222. These many be permanent locations, or the apparatus 222 may be configured to move the plates as temperatures change during the day. In a less complicated manner, too, a plurality of metals can be placed in a number of locations in the manhole, say in six different locations, and pairs of metal can be placed into circuit with each other based on known or observed temperature distributions, and varied in connection, across the day. Note that in general, an underground enclosure provides a moderating temperature environment that can be either cooler or warmer than its cover. Thus, over time, temperature differences in either direction may be utilized in the generation of energy.

The metal plates 304, 312 may be further configured to operate in the environmental conditions of the enclosure. In view of the corrosive conditions inside a manhole, for example, the plates could optionally be enclosed in a protective sheath, such as one of fluoropolymers (such as Teflon, a registered trademark of the DuPont company), urethane, vinyl, or any other polymer, to protect the metals from corrosion. Also, the plates 304, 312 could be secured to a region of the enclosure to prevent them from moving if the cover 236 is lifted. Also, the plates 304, 312 could be made waterproof, and (if the enclosure is a manhole) placed directly in a fluid in the manhole. These are merely examples of manners in which the metal plates 304, 312 could be configured in view of the environmental conditions of the enclosure, and other configurations may be used.

Figure 4:
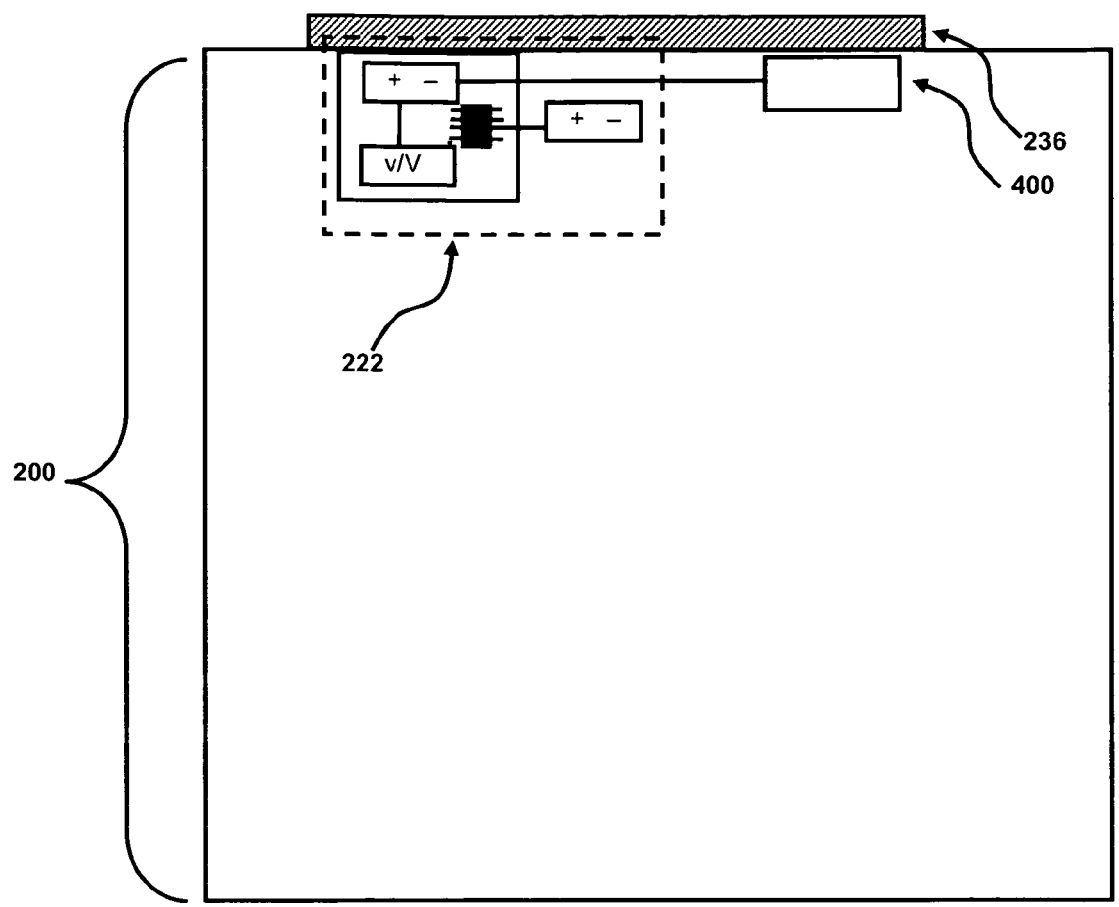
FIG. 4 illustrates an apparatus for generating power in an enclosure utilizing condensation at a manhole cover according to the present disclosure.

FIG. 4 illustrates an apparatus 222 for generating power in an enclosure 200 utilizing condensation at a manhole cover 236 according to the present disclosure. A manhole is a known moist environment. Since humidity inside manholes typically reaches 100%, and since metal manhole covers can be of a lower temperature than the ambient air in the manhole (especially at night or during the winter), a significant amount of water condensation can occur on and around manhole covers. Since condensation generates heat, thermoelectric materials such as those listed above can be used to generate current. Pairs of "n" and "p" doped semiconductors, or pairs of metals such as copper, zinc, iron, manganese, nickel, tin and silver, can be placed at the manhole cover. As illustrated, semiconductor pairs 400 are secured to the manhole cover 236, and condensation-generated heat can be converted into an electrical current which is supplied to the apparatus 222 and stored in the manner described above.

Semiconductor pairs 400 may be further configured to operate in the environmental conditions of the enclosure. In view of the corrosive conditions inside a manhole, for example, the semiconductors could optionally be enclosed in a protective sheath, such as fluoropolymers, urethane or vinyl, or any other polymer, as long as the sheath does not thermally insulate the semiconductor. Also, the pairs 400 could be secured to a region of the enclosure to prevent them from moving if the cover 236 is lifted. These are merely examples of manners in which the pairs 400 could be configured in view of the environmental conditions of the enclosure, and other configurations may be used.

Figure 5:
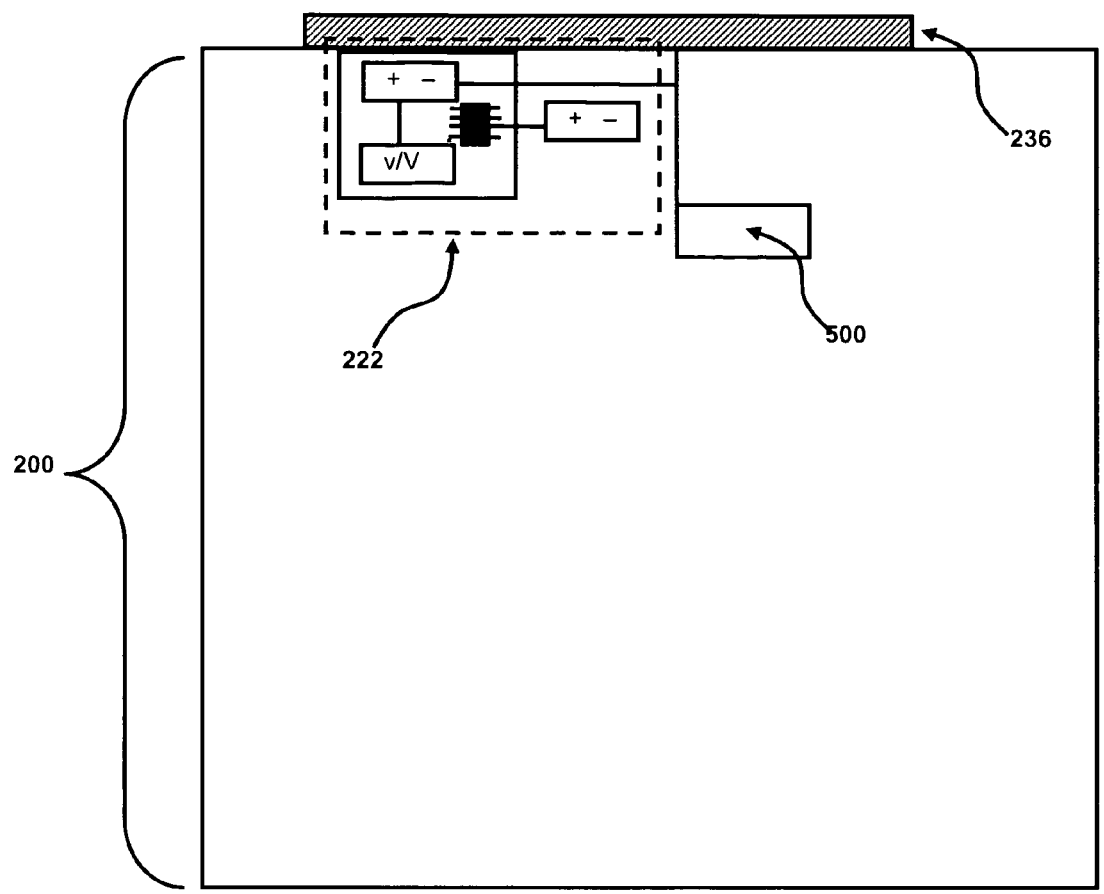
FIG. 5 illustrates an apparatus for generating power in an enclosure utilizing transmission of moisture through a membrane according to the present disclosure.

FIG. 5 illustrates an apparatus 222 for generating power in an enclosure 200 utilizing transmission of moisture through a membrane 500 according to the present disclosure. As noted above, a manhole provides a unique climate, where underneath the manhole cover 236 the relative humidity is often at or close to 100%, while the ambient air is frequently less than 100% humidity. Electric power can generated by the transmission of moisture through a membrane, with electrodes capturing the small current generated. As a non-limiting example, a semi-permeable membrane with a salt solution can be used to absorb water from a high humidity region and evaporate the water to a lower humidity region. A small voltage potential would be thus observed across the membrane, which could be exploited for power generation. One example of a mechanism which could be utilized in accordance with this disclosure may be found in U.S. Pat. No. 6,185,940, incorporated herein by reference.

The membrane 500 may be further configured to operate in the environmental conditions of the enclosure. In view of the climate conditions inside a manhole, for example, the membrane 500 could be provided with a balanced salinity which is not likely to change over time, even as humidity and salinity in the manhole vary. Also, the membrane 500 could be secured to a region of the enclosure to prevent it from moving if the cover 236 is lifted. Also, the membrane 500 could be placed at a hole in the manhole cover 236, and thus capture humidity from the manhole air as it escapes to the dry outside. These are merely examples of manners in which the membrane 500 could be configured in view of the environmental conditions of the enclosure, and other configurations may be used.

Figure 6:
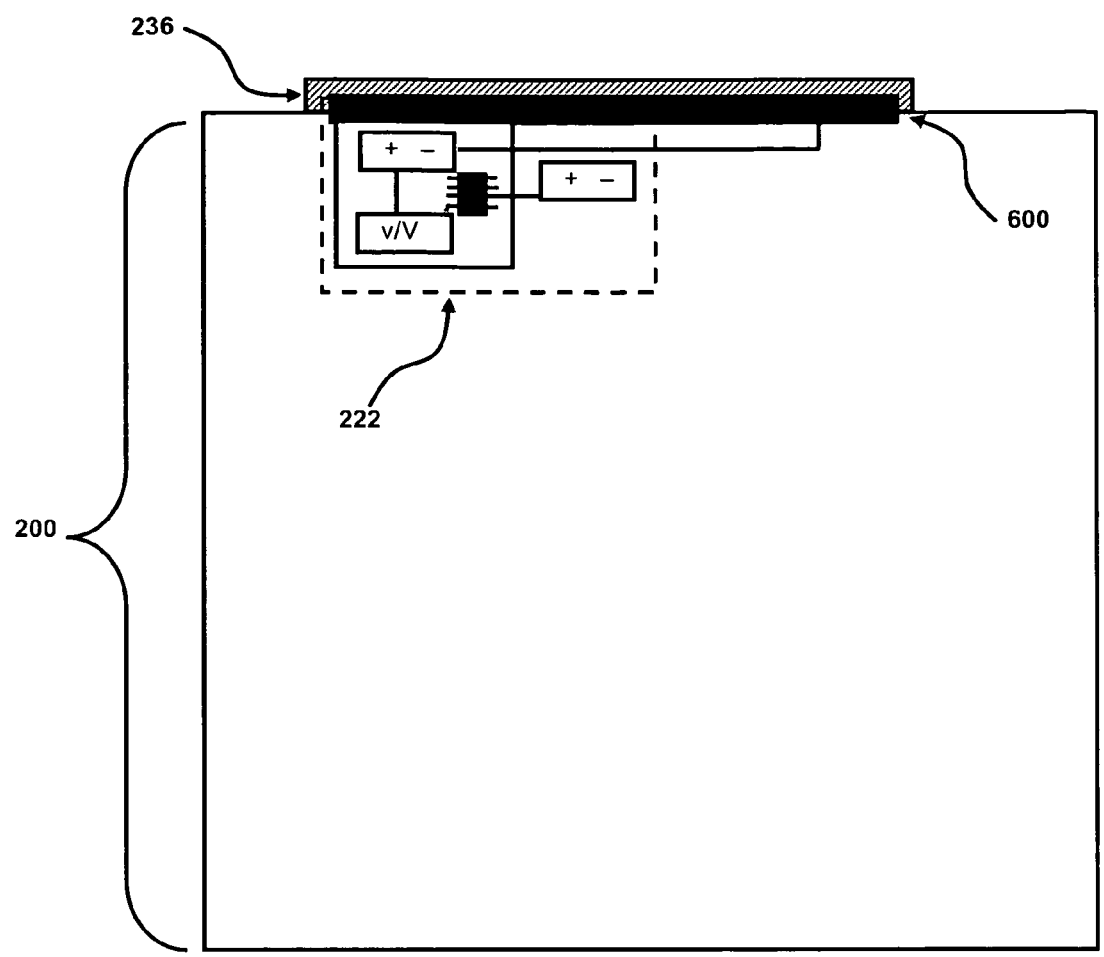
FIG. 6 illustrates an apparatus for generating power in an enclosure utilizing ambient radio frequency energy according to the present disclosure.

FIG. 6 illustrates an apparatus 222 for generating power in an enclosure utilizing ambient radio frequency energy according to the present disclosure. The apparatus 222 utilizes an antenna 600, which may be a loop, dipole or single probe antenna. The antenna may be mounted under a dielectric manhole cover 236 as illustrated here, or could alternatively be mounted on the top of a metallic manhole cover. The antenna could be sensitive to either the electric or magnetic fields of ambient radio (AM, FM, cellular phone transmission) or AC power line signals. The manhole cover 236 itself could also be utilized as an antenna for this purpose. As non-limiting examples of mechanisms by which ambient radio frequency energy can be converted, radio signals that the antenna receives could be either directly rectified by a diode, or could alternatively be switched by an MOS transistor, to create a uni-directional voltage from the alternating current. This current would then be used to charge the first storage device, which could advantageously be a capacitor.

The antenna 600 may be further configured to operate in the environmental conditions of the enclosure. In view of the corrosive conditions inside a manhole, for example, the antenna could optionally be enclosed in a protective sheath, such as fluoropolymers, urethane or vinyl, or any other polymer, to protect the antenna from corrosion. Also, the antenna could be secured to a region of the enclosure to prevent it from moving if the cover 236 is lifted. These are merely examples of manners in which the antenna 600 could be configured in view of the environmental conditions of the enclosure, and other configurations may be used.

Figure 7:
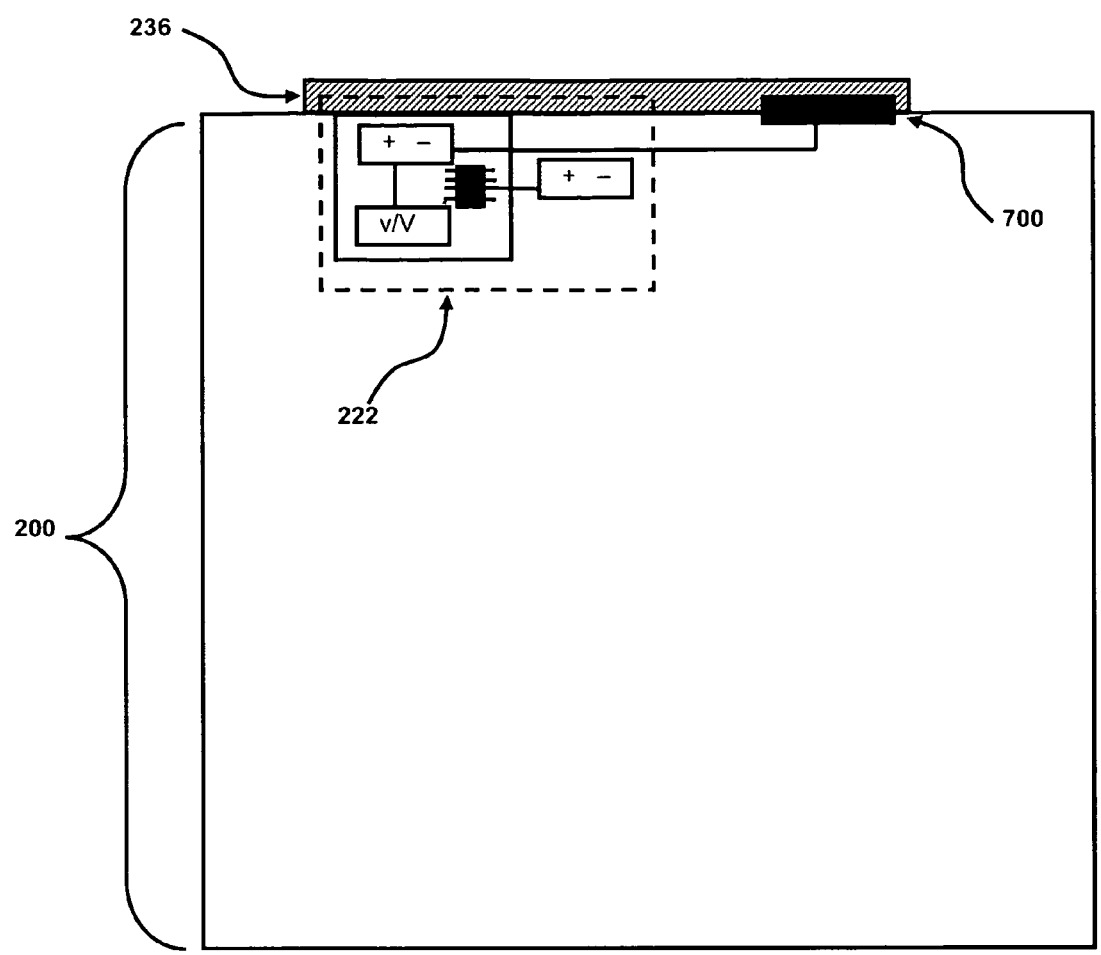
FIG. 7 illustrates an apparatus for generating power in an enclosure utilizing acoustic or seismic motion according to the present disclosure.

FIG. 7 illustrates an apparatus 222 for generating power in an enclosure 200 utilizing acoustic or seismic motion according to the present disclosure. The power generation device can include an electromechanical generator or microelectromechanical system which derives an electrical current from acoustic or seismic motion. As illustrated, an electromechanical generator 700 is attached to the underside of a manhole cover 236. When the manhole cover is in a busy traffic area, it will experience significant bumping and vibration due to passing traffic. The power associated with this acoustic or seismic vibration can be harnessed by the electromechanical generator 700, in a manner similar to that utilized in self-winding watches, or may be harnessed by a microelectromechanical system, to convert these vibrations to a useful electric current, which is supplied to the first power storage device of the apparatus 222.

The generator 700 may be further configured to operate in the environmental conditions of the enclosure. In view of the corrosive conditions inside a manhole, for example, the generator 700 could optionally be enclosed in a protective sheath, such as fluoropolymers, urethane or vinyl, or any other polymer, to protect it from corrosion. Also, the generator 700 could be made waterproof, and (if the enclosure is a manhole) placed directly in a fluid in the manhole, where fluid motion could be used to derive power. These are merely examples of manners in which the generator 700 could be configured in view of the environmental conditions of the enclosure, and other configurations may be used.

Figure 8:
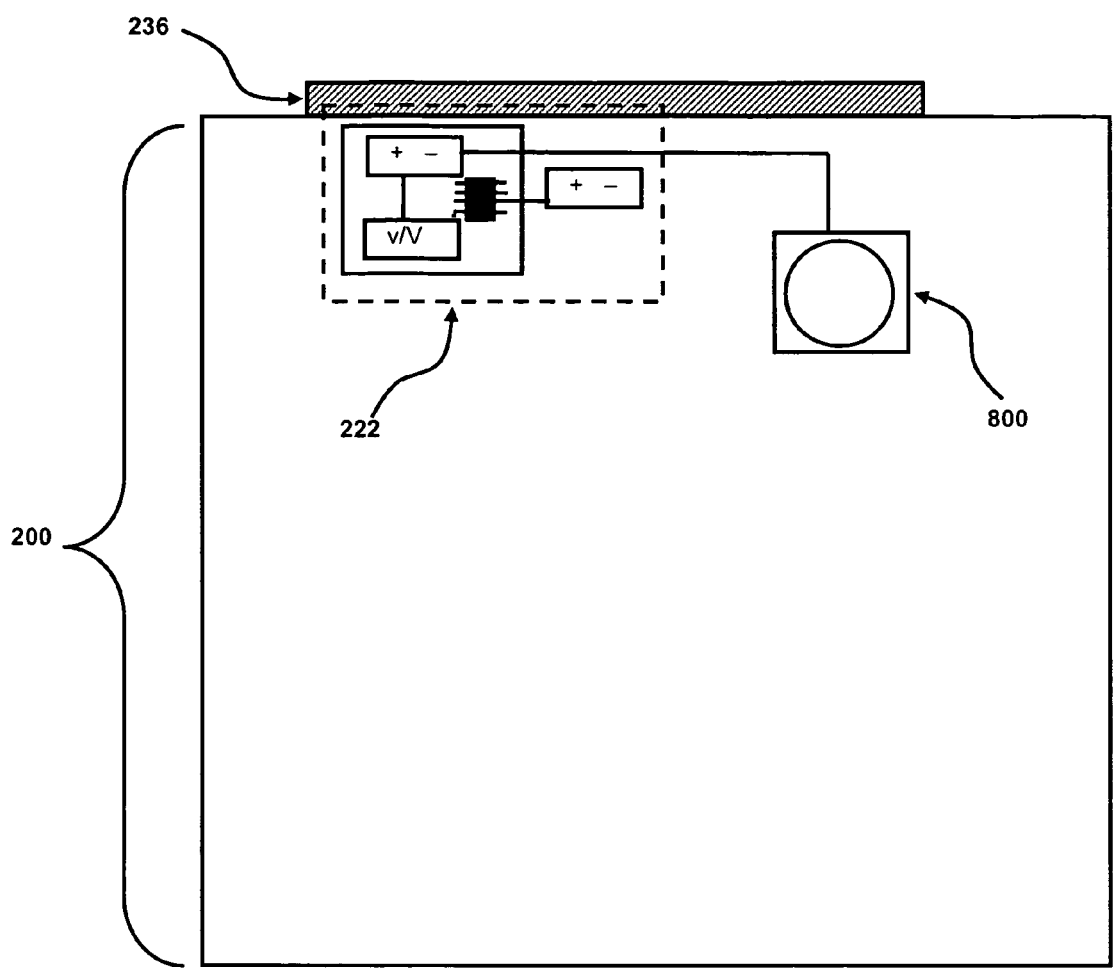
FIG. 8 illustrates an apparatus for generating power in an enclosure utilizing airflow according to the present disclosure.

FIG. 8 illustrates an apparatus 222 for generating power in an enclosure 200 utilizing airflow according to the present disclosure. The apparatus 222 is attached to a cover of the enclosure 236 (which may be a manhole cover), and includes an electromechanical generator 800 suspended therefrom, in an optimal location to derive an electrical current from motion induced by airflow in the enclosure. The generator 800 may be a fan, whose blades turn a generator when driven by convection currents due to temperature gradients in the enclosure, such as those which occur in a manhole.

The generator 800 may be further configured to operate in the environmental conditions of the enclosure. In view of the corrosive conditions inside a manhole, for example, the blades or windings of the generator 800 could optionally be enclosed in a protective sheath, such as fluoropolymers, urethane or vinyl, or any other polymer, to protect the metals from corrosion. Also, the generator 800 could be secured to a region of the enclosure to prevent it from moving if the cover 236 is lifted. Also, the generator 800 could be made waterproof, and (if the enclosure is a manhole) placed directly in a fluid in the manhole, to be moved by fluid instead of by air. These are merely examples of manners in which the generator 800 could be configured in view of the environmental conditions of the enclosure, and other configurations may be used.

Figure 9:
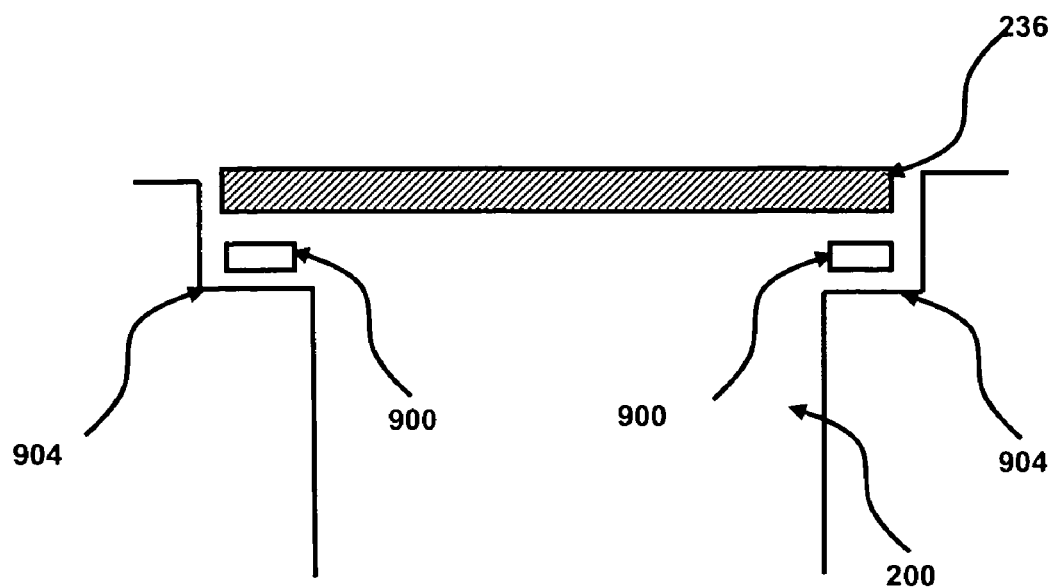
FIG. 9 illustrates portions of an apparatus for generating power in an enclosure utilizing traffic impacts according to the present disclosure.

FIG. 9 illustrates portions of an apparatus for generating power in an enclosure 200, utilizing traffic impacts according to the present disclosure. A ring-shaped pad 900 rests between a cover of the enclosure 236, such as a manhole cover, and a surface of the enclosure 904, such as a manhole run. The pad 900 includes piezoelectric or electromagnetic elements.

Figure 10:
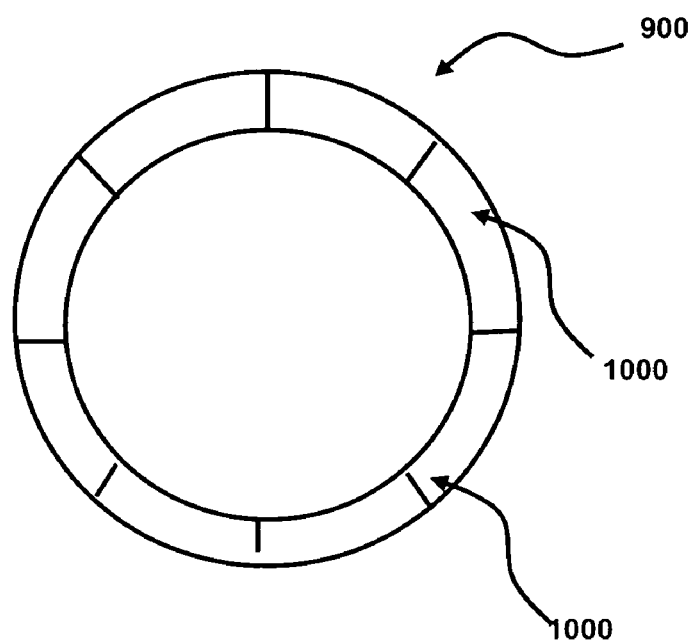
FIG. 10 illustrates a close-up of the apparatus of FIG. 9.

FIG. 10 illustrates a close-up of the ring-shaped pad 900 of FIG. 9. The pad is formed of a plurality of ring segments 1000, each of which operates so that if a vehicle passes over the cover (or the cover is otherwise pressured), one or more ring segments could generate independent pulses of electric power through a piezoelectric effect, similar to the generation of a high-voltage spark by the trigger of a butane lighter, or through an electromagnetic effect. As non-limiting examples, the pad 900 may comprise anywhere from two to twenty or more segments. As non-limiting examples, piezoelectric materials used in the segments 1000 may include, but are not limited to, quartz, polyvinylidene fluoride (PVDF), and piezoceramic materials. Although small voltages are also useful, piezoelectric materials such as these can generate voltages in the range of 10 to 100 volts. Again, such voltages could be rectified and stored, and a power converter (not shown) could step down the voltages to a lower, more useful voltage.

The pad 900 may be further configured to operate in the environmental conditions of the enclosure. In view of the corrosive conditions inside a manhole, for example, the pad could optionally be enclosed in a protective sheath, such as urethane or vinyl, or any other polymer, to protect the piezoelectric materials from corrosion or wear. Also, the pad could be secured to the enclosure surface 904 to prevent it from moving if the cover 236 is lifted. These are merely examples of manners in which the pad 900 could be configured in view of the environmental conditions of the enclosure, and other configurations may be used.

As an alternative configuration, note that instead of utilizing the enclosure cover 236, pad 900 can instead be placed within the enclosure 200, and can include not only piezoelectric or electromagnetic generators, but also gases which expand or contract in accordance with diurnal changes in the temperature of an enclosure cover or other enclosure structure to drive the generators.

As a yet alternative configuration, note that pad 900 can include gases, liquids, or other materials which can expand or contract in accordance with changes in barometric pressure of the enclosure and the surrounding atmosphere, and that these changes can drive the generators.

The previous description of some aspects is provided to enable any person skilled in the art to make or use the presently disclosed methods and apparatuses. Various modifications to these aspects will be readily apparent to those skilled in the art, and the generic principles defined herein may be applied to other aspects without departing from the spirit or scope of the inventive subject matter. For example, one or more elements can be rearranged and/or combined, or additional elements may be added. Thus, the present inventive subject matter is not intended to be limited to the aspects shown herein but is to be accorded the widest scope consistent with the principles and novel features disclosed herein.

What is claimed is:
1. An apparatus for generating power in a manhole enclosure, the apparatus comprising:

a power generation device configured to operate with environmental conditions of the manhole enclosure;

a first power storage device connected to the power generation device and configured to store power generated by the power generation device;

a power converter connected to the first power storage device and configured to output power at a voltage different than that output by the first power storage device; and a second power storage device connected directly or indirectly to the power converter and configured to store power output by the power converter, wherein the second power storage device provides power for at least one component of an environmental monitoring system.

2. The apparatus of claim 1, the apparatus further comprising a controller connected to the power converter and to the second power storage device, wherein the controller controls the transfer of power from the power converter to the second power storage.

3. The apparatus of claim 1, wherein the first power storage device is a capacitor.

4. The apparatus of claim 1, wherein the first power storage device is a rechargeable battery.

5. The apparatus of claim 1, wherein the power generation device derives an electrical current from a temperature difference between two areas of the manhole enclosure.

6. The apparatus of claim 5, wherein the two areas of the enclosure are selected from the group consisting of: inner surface of a manhole cover; outer surface of the manhole cover; a manhole wall; a manhole ladder; middle of the manhole; bottom of the manhole; and, fluid in the manhole.

7. The apparatus of claim 1, wherein the power generation device derives an electrical current from a temperature change caused by condensation at a manhole cover.

8. The apparatus of claim 1, wherein the power generation device comprises a membrane which derives an electrical current from the transmission of moisture through the membrane.

9. The apparatus of claim 1, wherein the power generation device comprises an electromechanical generator or microelectromechanical system which derives an electrical current from acoustic or seismic motion of a manhole cover.

10. The apparatus of claim 1, wherein the power generation device comprises an electromechanical generator which derives an electrical current from motion induced by airflow in the manhole enclosure, wherein the airflow comprises convection currents due to temperature gradients in the manhole enclosure.

11. The apparatus of claim 1, and wherein the power generation device comprises a ring of piezoelectric or electromagnetic generators under a cover of the manhole enclosure but above a manhole run, wherein the power generation device derives an electrical current from traffic impacts to the cover.

12. A method of generating power in a manhole enclosure, the method comprising:

deriving an electrical current from at least one environmental aspect of the manhole enclosure;

storing an electrical charge generated by the electrical current;

converting the stored charge to a charge of a different voltage;

storing the different voltage charge; and transferring the stored different voltage charge to at least one component of an environmental monitoring system.

13. The method of claim 12, wherein the environmental aspect comprises a temperature difference between two areas of a manhole cover and the manhole enclosure.

14. The method of claim 12, wherein the environmental aspect comprises a temperature change caused by a formation of condensation at a surface of a manhole cover.

15. The method of claim 12, wherein the environmental aspect comprises moisture, and wherein the electrical current is derived from passage of the moisture through a membrane.

16. The method of claim 12, wherein the environmental aspect comprises acoustic or seismic motion of a manhole cover, and wherein the electrical current is derived by an electromechanical generator or microelectromechanical system.

17. The method of claim 12, wherein the environmental aspect comprises convention airflow currents due to temperature gradients in the manhole enclosure, and wherein the electrical current is derived from motion induced by the airflow.

18. A system for generating power in a manhole enclosure, the system comprising:

means for deriving an electrical current from at least one environmental aspect of the manhole enclosure;

means for storing an electrical charge generated by the electrical current;

means for converting the stored charge to a charge of a different voltage;

means for storing the different voltage charge; and means for transferring the stored different voltage charge to at least one component of an environmental monitoring system.

* * * * *